United States Patent [19]

Menke et al.

[11] 4,004,274
[45] Jan. 18, 1977

[54] SIGNAL LIGHT ASSEMBLY

[75] Inventors: Kenneth W. Menke, Glendale; Michael D. Latta, Ladue, both of Mo.

[73] Assignee: Public Safety Equipment, Inc., Maryland Heights, Mo.

[22] Filed: Oct. 22, 1975

[21] Appl. No.: 624,912

[52] U.S. Cl. .................................. 340/84; 340/50
[51] Int. Cl.² ......................................... B60Q 1/00
[58] Field of Search ............................... 340/84, 50

[56] References Cited
UNITED STATES PATENTS

| | | | |
|---|---|---|---|
| 2,762,994 | 9/1956 | Kennelly | 340/84 X |
| 2,832,059 | 4/1958 | Adler, Jr. | 340/50 X |
| 3,271,735 | 9/1966 | Gosswiller | 340/50 |
| 3,404,371 | 10/1968 | Gosswiller | 340/50 X |
| 3,739,336 | 6/1973 | Burland | 340/50 |

*Primary Examiner*—Donald J. Yusko
*Attorney, Agent, or Firm*—Gravely, Lieder & Woodruff

[57] ABSTRACT

A signal light assembly for vehicles requiring positive visual identification for either emergency service or traffic control usage, in which an identification beacon is provided with rotating lamp carrying pod means having the lamps positioned to produce an effective pattern of light flashes and dark periods from remote observation position to the front, to the rear, and to the sides of the vehicle, the result of which is effective to draw attention to the vehicle.

9 Claims, 4 Drawing Figures

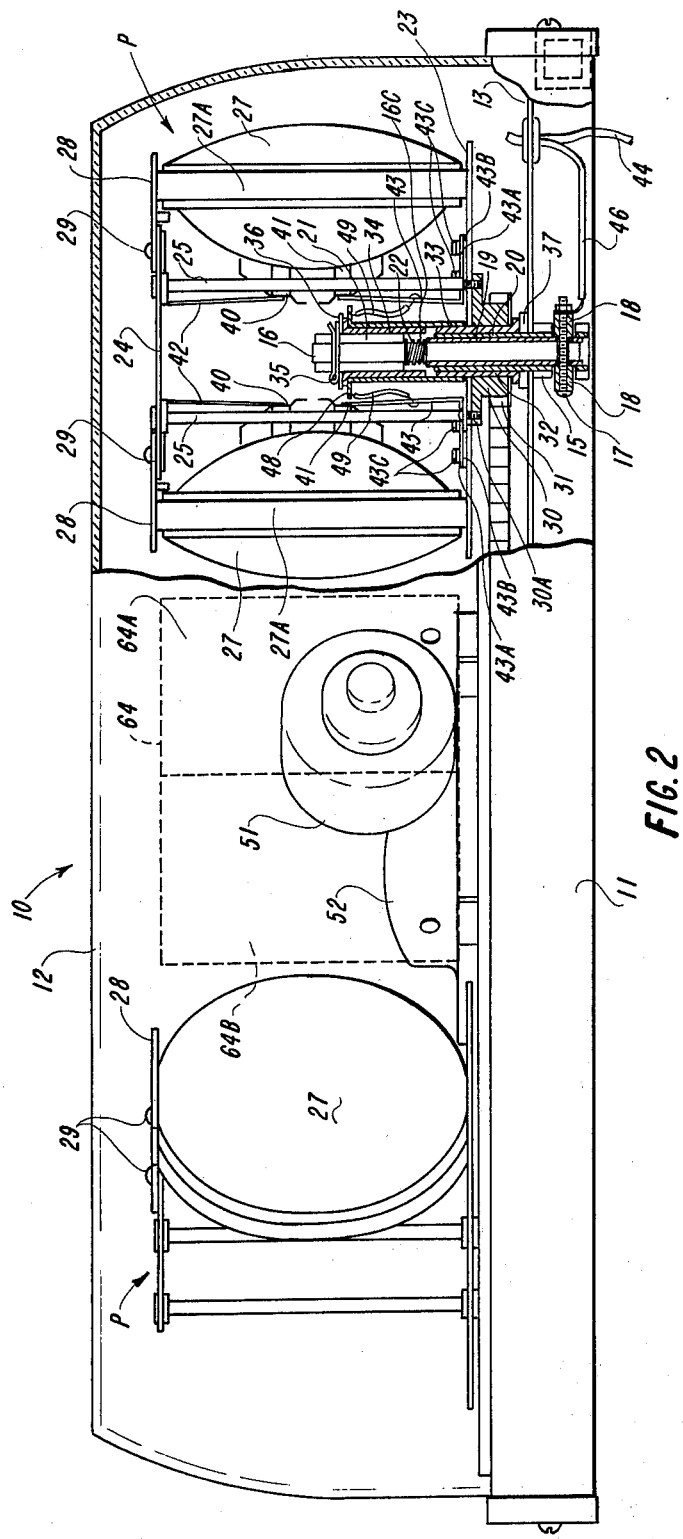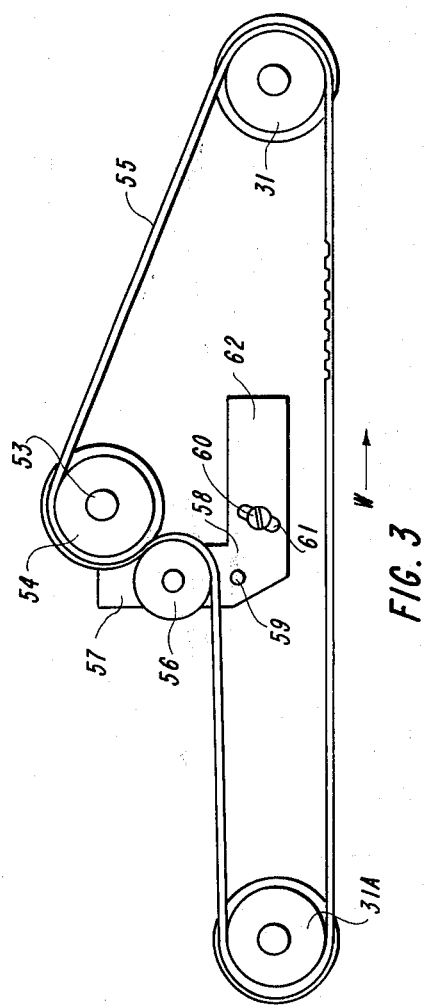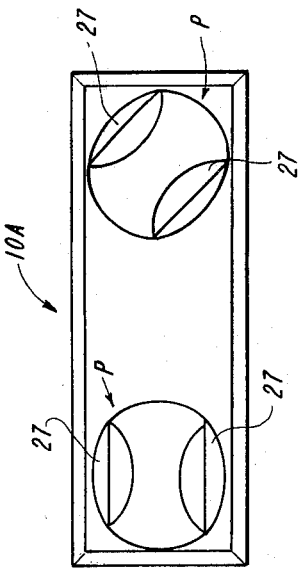

SIGNAL LIGHT ASSEMBLY

BRIEF SUMMARY OF THE INVENTION

This invention relates to improvements in signal light assemblies for marking the movement of or standing position of emergency or other types of service vehicles.

Signal light equipment or beacons for emergency vehicles and for police vehicles should have the ability to draw positive and rapid attention, without increasing the electrical energy required to operate the device, but by improving the pattern of light flashes so as to gain the required recognition at substantial distances. It is also a characteristic of signal light assemblies that they should be capable of being non-permanently installed on vehicles, should have similar and easily repairable operating mechanisms, and should be capable of incorporating specified arrangements of lamps in one or more rotating pods.

A principal object of the present invention is to provide a signal light assembly consisting of an organization of lamp carrying pod means which operate to produce an improved and positive pattern of light flashes separated by intervening dark intervals, so as to draw rapid and positive attention to the vehicles on which the same is mounted.

Other objects of the present invention will appear from the detailed description of certain preferred embodiments: and a particularly important embodiment comprises a mounting base supporting pod means in the form of rotatable frames, driving means connected to the pod means to effect its rotation in a circular orbit, light beam producing lamps secured on the rotating frames in operative position so that the light beams from the lamps have an angular spacing which projects a distinctive and highly effective pattern of light flashes and dark intervals.

A preferred embodiment of the present invention resides in a base supporting a pair of rotating frames, each carrying lamps which cast narrow beams of light which produce flashes when seen from a remote observation position, mounting the lamps in asymmetrical angular relations or in symmetrical angular relations but in asymmetrical orientation, and driving the frames in unison to project principal light flash patterns in azimuth forwardly and rearwardly of the vehicle on which it is mounted, and secondary light flash patterns in azimuth to each side of the vehicle.

Other embodiments of the present invention comprise an assembly having rotating lamp carrying frames forming pod means in which the lamp positions produce distinctive angular relations of light beams, and means to rotate the pod means at the same speed or at different speeds to enhance the patterns of light flashes and improve recognition of the vehicle carrying the same.

BRIEF DESCRIPTION OF THE DRAWINGS

Certain preferred embodiments of the present invention have been illustrated in the accompanying drawings, wherein:

FIG. 2 is a front elevational view taken at line 2—2 in FIG. 1, with portions shown in section to disclose a typical arrangement for mounting the frame of pod means;

FIG. 3 is a view showing the drive for the rotating pod means; and

FIG. 4 is a schematic plan view of pod means and supporting lamps having an alignment different from the alignment of lamps shown in FIG. 1.

DETAILED DESCRIPTION OF THE EMBODIMENTS

Figure 1:
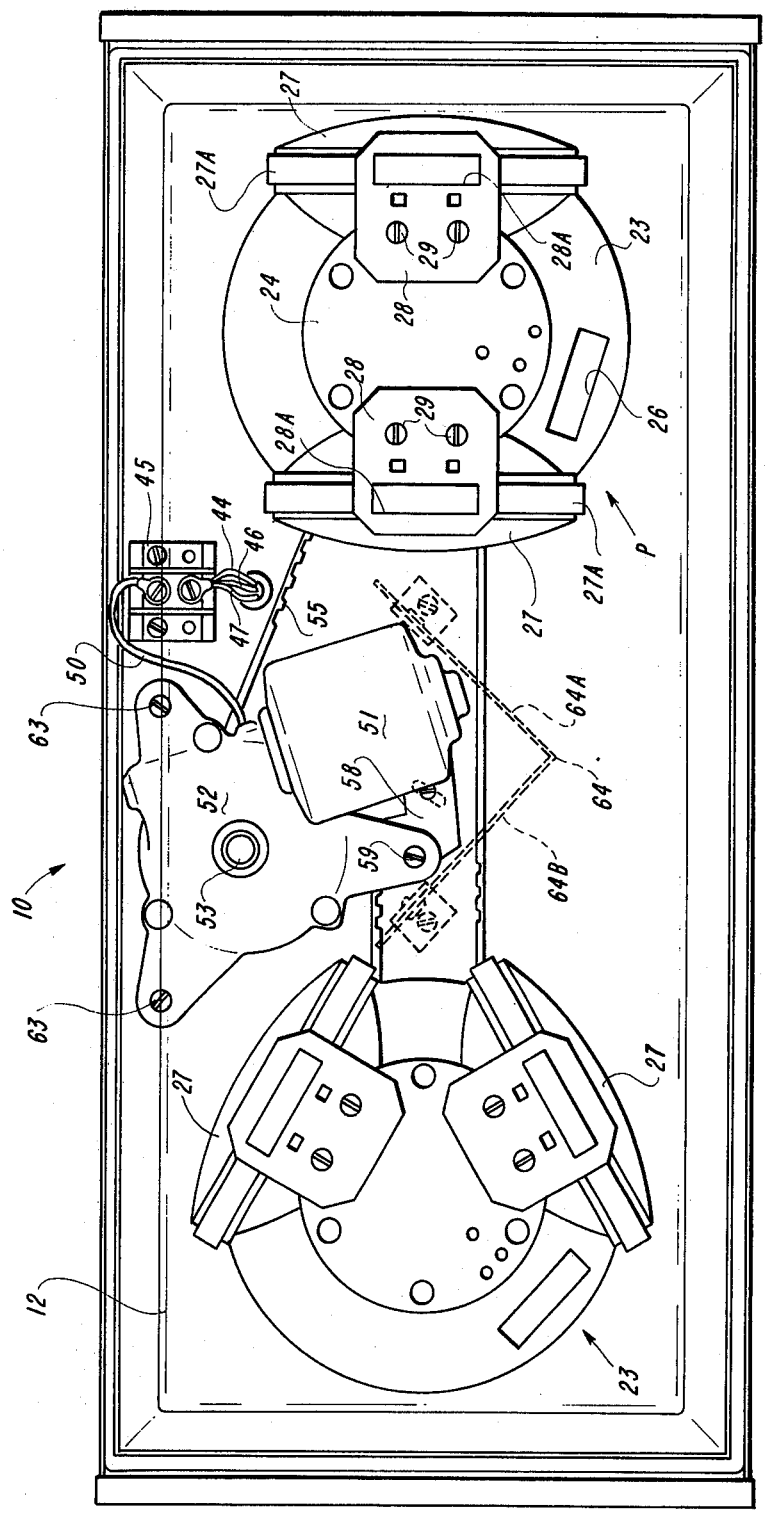
FIG. 1 is a plan view of a beacon embodying pod means divided into two portions producing a flashing light pattern characteristics of the present invention.

The signal light beacon is seen in one embodiment in FIGS. 1 and 2 wherein the entire assembly forms a beacon 10 consisting of a base pan 11 opening upwardly to receive the bottom open side of a transparent cover 12. The cover 12 encloses a floor plate 13 spaced above the bottom wall of the base pan 11 by an arrangement of hollow box frame members 14. The floor plate extends beneath a pair of pod means spaced apart and mounted for rotation about parallel posts so that beam producing lamps cast narrow light beams in circular orbits such that when observed from a remote position the beams appear as flashes having momentary brilliance followed by intervals of dark.

The portion of the floor plate 13 under the pod means is supported by a box member 15 which is adapted to carry metallic post 16 (one being seen in FIG. 2) anchored to the box member 15 by a cross bolt 17 set in insulating sleeves 18 so as to prevent electrical contact of the bolt 17 with the box member 15. The post 16 is surrounded by an insulating sleeve 19 placed inside a surrounding shaft sleeve 20 which is held against rotation. The upper portion of post 16 is surrounded by a shaft sleeve 21 which is in electrical contact with the post 16 and is held in position by a tapered spring 22. The small end of the spring 22 rests on the top of insulating sleeve 19 while the large end abuts the sleeve 21.

The right hand pod means P in FIG. 1 is made up of a frame in which a base plate 23 and a cap plate 24 are held in spaced relation by a plurality of struts 25 having the respective ends riveted into or otherwise secured in contact with the plates 23 and 24. The base plate is formed with suitable cut-outs 26 like the one seen in FIG. 1, and these cut-outs are on a radius greater than the radius of the cap plate so that the rim 27A of the lamps 27 will firmly seat therein. The cap plate 24 carries suitable holder tabs 28 formed with cut-outs 28A (FIG. 1) which clamp over the lamp rims 27A when the threaded elements 29 are tightened into the cap plate 24.

The frame having the foregoing components is provided with a hub 30 attached by its flange 30A to the base plate 23 at its center. The hub is formed with a gear 31 by which the entire frame is rotated. The hub 30 has a center aperture which receives a tubular bearing 32 abutted on the gear 31 by its flange. The bearing 32 extend through the base plate 23 and projects into one end of insulating sleeve 33. The upper end of the sleeve 33 supports the flange of a second bearing 34 and holds the latter bearing out of electrical contact with the lower bearing. The foregoing assembly is adapted to be fitted down over the post 16 and its upper sleeve 21 and its lower insulated sleeve 20. The assembly is retained by a cotter pin 35 and a thrust washer 36, and the weight of the frame is taken on a bottom thrust plate 37 at the floor plate 13.

The lamps 27 on being clamped into position by the holder tabs 28 make electrical contact between the lamp contacts 40 and 41, which project from the back of the lamps, and resilient contact brushes 42 and 43. The brushes 42 are fixed by rivets or other means to the under side of the cap plate 24, and are located angularly about the axis of the post 16 to match the position for the lamps. Each brush 43 has a base flange 43A mounted on an insulating pad 43B and secured by a rivet 43C with an insulating shoulder washer. The brushes 42 and 43 are positioned to suit the positions of the lamps 27 for making the required electrical contacts. The arrangement of lamp contacts and contact brushes for the left hand pod means P of FIGS. 1 and 2 is similar and need not be described.

The electrical circuit connections are made by bringing the power supply lead 44 through the base pan 11 and floor plate 13 to a contact block 45 (FIG. 1). There are two leads 46 and 47 which are directed back through the floor plate 13 and these are connected into the posts 16 in the manner shown for the lead 46 at the right hand pod P in FIG. 2.

The lead 46 is attached to the cross bolt 17 which is in electrical contact with the fixed post 16 and is insulated from all of the surrounding structure. The post 16 forms a continuation of the lead 46 to a contact washer 48 which is positioned under the flange of the upper bearing sleeve 36 and on top of the upper end of the spacer sleeve 33. A suitable lead 49 from the contact washer 48 is connected to one of the brushes 43 and a similar lead 49 is connected to the companion brush 43. This completes one side of the circuit to the lamps 27. The other side of the lamp circuit is made through the brushes 42, the frame structure for the pod P and the base pan 11. It is customary in the vehicle systems to have the electrical circuit grounded, and in the present disclosure the negative side of the circuit is grounded and the positive side of the circuit is represented by the lead 44 which is connected into the contact block 45. It is of course understood that the second lead 47 is connected into the left hand pod P in a manner just described above, and for that reason it has not been shown.

The contact block 45 is provided with a tap for a lead 50 which is connected into the drive unit for rotating the pods P. The drive includes a motor 51 which is suitably connected into a gear box 52, and the gear box supports a drive shaft 53 which, as may be seen in FIG. 3 is connected to a main drive gear 54. The drive gear is connected by an endless timing belt 55 to the gear 31 on the hub 30 for the frame of the right hand pod P. The left hand pod has a similar gear 31A which is driven by the timing belt 55. An idler pulley 56 is carried on one arm 57 of an adjustment device 58. The device 58 is movable about a pivot 59, and the device 58 is held in adjusted positions by a threaded element 60 positioned in a slot 61 formed in the opposite arm 62 of the device 58. The drive motor 51 and gear box 52 are suitably supported on top of the floor plate 13, and the gear box 52 is held in fixed position by threaded elements 63 and by the threaded element 59 which also forms the pivot for the idler pulley adjustment device 58. The operation of the timing belt 55, is viewed in FIG. 3 in the direction of the arrow W for rotating the pods P in a counterclockwise direction.

With the lamps 27 of the right hand pod arranged in an angular spacing of 180°, and the lamp means 27 in the left hand pod being turned to the positions shown for the angular spacing of approximately 108°, and further with the right hand lamps 27 turned so that the orientation of the 180° axis of separation intersects the axis of rotation of the left hand pod P, it follows that the angle of separation of the left hand lamps is bisected. The desirable effect of this alignment of the lamps in the respective pods is to produce from a remote point of observation in front and to the rear of the beacon 10 a sequence of light flashes and intervening dark intervals where there will be three consecutive light flashes spaced apart by short duration periods of dark, and an extended period of dark interrupted once by a single light flash. In this sequence of light flashes and intervening dark periods, the dark periods between the three consecutive flashes will be short in comparison to the substantially equal and longer periods of dark on each side of the single light flash. The specific angular spacing of the lamps 27 in the left hand pod is a preferred selection, but this spacing may be varied between an angle of less than 180° to an angle greater than 90°. Another variable coming within the scope of the disclosure is the spacing between the pods so that the principal light flash pattern forwardly and rearwardly will cover an angle of about 160°, and a secondary light flash pattern will be oriented within about 20° of arc to each side. The secondary pattern at each side will come from one pod only as a consequence of the blocking effect of the one pod on the other pod.

A modification of the foregoing beacon is schematically shown in FIG. 4 at beacon 10A. In order to simplify the description the view of FIG. 4, structure which has already been shown and described in FIGS. 1, 2 and 3 will be noted by similar reference numerals, as the structure is the same. The essential difference resides in the arrangement of the lamps 27 in each of the frames making up pods P. In this modification the lamps in each pod are set at 180° of angular separation, and the lamps in the right hand pod have been initially angularly turned so as to be out of phase with the 180° alignment of the lamps in the left hand pod. The preferred amount of angular out of phase alignment is about 54° but may vary from about 30° to about 65°. The drive means for this modified alignment of lamps may be arranged to rotate the pods P at the same speed in the manner shown in FIG. 3 where the gears 31 and 31A are the same.

The desirable effect of this alignment of lamps in the respective pods is to produce from a remote point of observation in front and to the rear of beacon 10A a sequence of light flashes and intervening dark intervals where there will be two consecutive light flashes spaced apart by a short duration period of dark and an extended interval of dark interrupted by two flashes separated by only a short interval of dark. In this sequence of flashes and intervening dark period, the dark periods between each of the two consecutive flashes will be short in comparison to the substantially equal and longer periods of dark on either side of the pair of flashes. As in the case of beacon 10 the spacing between pods is such that the principal light flash pattern forwardly and rearwardly will cover an angle of 160°, and a secondary light flash pattern will be oriented within about 20° of arc to each side. The secondary light flash pattern will come from one pod only as the consequence of the blocking effect of one pod on the other pod.

When it is desired to alter the pattern of light flashes and intervening dark periods in the beacon shown in FIG. 1 or in the modified beacon of FIG. 4, the gears 31 and 31A shown in FIG. 3 must be changed so that they are not the same. This can be very simply done before the frame assembly is slid into position on the fixed posts 16 by interchanging one of the hubs 30 (FIG. 2) with a hub that has been formed with a desired size gear.

The views of FIGS. 1 and 2 depict in dotted outline the position of a flat surface mirror device 64 having angularly presented reflecting faces 64A and 64B. This mirror device is placed between the lamp frames to pick up light that is otherwise lost in the interior of the beacon.

The foregoing disclosure of several embodiments of the present invention has set forth details of a signal light assembly which may have a beacon provided with rotating pods carrying lamps aligned in the manner shown. While signal lights with rotating pods have been in use for a long time, the need to achieve a more brilliant array of light flashes is carried out by arranging the lamps in an alignment as described herein which develops a positive attention getting sequence of light flashes and dark intervals.

What is claimed is:

1. In a flashing signal light beacon for vehicle recognition, the improvement consisting of a base frame; a pair of spaced posts fixed on said base frame and extending therefrom in substantially parallel relation; a pod supported by and rotatively mounted on each post, each pod having a pair of lamps in angularly displaced positions about the supporting post with the lamps of a first pod displaced around its supporting post 180° apart and the lamps of the second pod displaced around its supporting post less than 180°; drive means operatively connected to said pods to rotate said pods simultaneously and maintain an orientation of the lamps in said pods such that said lamps of said first and second pods generate a coordinated flashing signal light display in all viewing positions within 160° of azimuth of the beacon to the front and to the rear and in which the display includes a sequence of three distinct light flashes in rapid succession followed by a single light flash.

2. The improvement set forth in claim 1, wherein said pair of lamps in said second pod are spaced apart by an angle of about 108°.

3. The improvement set forth in claim 1, wherein said pair of lamps in said second pod are angularly oriented relative to the pair of lamps in said first pod such that in an initial position of rotation the axis of alignment of said lamps in said first pod substantially bisects the angle of separation of said lamps in said second pods, whereby said three distinct light flashes are substantially 54° apart and said single light flash trails the last one of said three flashes by 126°.

4. The improvement set forth in claim 1, wherein said drive means rotates said pair of pods in unison and at substantially the same speed, and a V-shaped flat faced mirror is placed between said pods to direct light outwardly between said pods, whereby said mirror faces create secondary light flashes substantially filling the intervals between all of said first mentioned light flashes.

5. In a flashing signal light beacon for vehicle recognition, the improvement of: a base; a pair of posts fixed relative to said base and extending therefrom in spaced parallel positions; a light pod carried on each post, each pod including a frame assembly slidably disposed over each post, each frame assembly having a drive gear and means to receive and attach lamps in angularly spaced relation about said fixed post, the lamps in a first one of said frame assemblies being in a different angular orientation from the lamps in the second one of said frame assemblies; an electrical circuit connection through said fixed posts to said lamps, said rotating frame assemblies being the other side of the electrical circuit; a drive gear hub on each frame assembly; and drive means on said base operatively connected to each of said drive gear hubs to rotate said frame assemblies of each pod, the rotation of said frame assemblies directing the light from said lamps to sweep an azimuth areas of about 160° forwardly and rearwardly of the vehicle and produce from a remote position of observation within the sweep azimuth area a succession of individual bright light flashes directly from said lamps and intervals of dark between the light flashes.

6. The improvement set forth in claim 5, wherein said lamps in each of said pod frame assemblies being at substantially 180° of spacing about said fixed posts.

7. The improvement set forth in claim 6, wherein said drive means engages said drive gear hubs in positions of said hubs which maintain said lamps in one of said pod frame assemblies out of phase by about 30° to 65° with said lamps in the other one of said pod frame assemblies.

8. The improvement set forth in claim 5, wherein said lamps in one pod frame assembly are angularly spaced substantially 180°, and the lamps in the other pod frame assembly are angularly spaced within a range of from less than 180° to more than 90°.

9. The improvement set forth in claim 8, wherein said angular spacing of the lamps in said other pod frame assembly is substantially 108°.

* * * * *